United States Patent
Hagiwara

(10) Patent No.: US 11,835,790 B2
(45) Date of Patent: Dec. 5, 2023

(54) OPTICAL SYSTEM AND IMAGE PICKUP APPARATUS HAVING THE SAME

(71) Applicant: CANON KABUSHIKI KAISHA, Tokyo (JP)

(72) Inventor: Yasuaki Hagiwara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 485 days.

(21) Appl. No.: 16/988,086

(22) Filed: Aug. 7, 2020

(65) Prior Publication Data

US 2021/0103123 A1    Apr. 8, 2021

(30) Foreign Application Priority Data

Oct. 4, 2019 (JP) .................. 2019-183429

(51) Int. Cl.
| | |
|---|---|
| *G02B 9/06* | (2006.01) |
| *G02B 9/12* | (2006.01) |
| *G02B 3/04* | (2006.01) |
| *G02B 15/14* | (2006.01) |

(52) U.S. Cl.
CPC .............. *G02B 9/06* (2013.01); *G02B 3/04* (2013.01); *G02B 9/12* (2013.01); *G02B 15/1421* (2019.08)

(58) Field of Classification Search
CPC ... G02B 9/06; G02B 9/04; G02B 9/12; G02B 15/1421
See application file for complete search history.

(56) References Cited

U.S. PATENT DOCUMENTS

| | | | |
|---|---|---|---|
| 9,274,325 | B2 | 3/2016 | Hagiwara |
| 10,594,944 | B2 | 3/2020 | Hagiwara |
| 2011/0090574 | A1* | 4/2011 | Harada ............... G02B 9/06 |
| | | | 359/717 |
| 2019/0101732 | A1* | 4/2019 | Yuki ................ G02B 13/18 |
| 2019/0250367 | A1* | 8/2019 | Murayama ........... G02B 9/04 |
| 2020/0249430 | A1* | 8/2020 | Kawamura ........... G02B 9/06 |

FOREIGN PATENT DOCUMENTS

| | | |
|---|---|---|
| JP | 2011-059290 A | 3/2011 |
| JP | 2011-107450 A | 6/2011 |
| JP | 2013-025157 A | 2/2013 |
| JP | 2013-37223 A | 2/2013 |
| JP | 2017-97197 A | 6/2017 |
| JP | 2019-101229 A | 6/2019 |
| JP | 2019-139158 A | 8/2019 |
| JP | 2019-215510 A | 12/2019 |
| JP | 2020-122941 A | 8/2020 |

OTHER PUBLICATIONS

Notice of Reasons for Refusal issued by the Japanese Patent Office dated Jun. 20, 2023 in corresponding JP Patent Application No. 2019-183429, with English translation.

* cited by examiner

*Primary Examiner* — Cara E Rakowski

(74) *Attorney, Agent, or Firm* — Carter, DeLuca & Farrell LLP

(57) ABSTRACT

An optical system includes, in order from an object side to an image side, a first lens unit having a positive refractive power, and a second lens unit having a positive refractive power. An interval between the first lens unit and the second lens unit changes during focusing. The second lens unit includes, in order from the object side to the image side, a first subunit having a positive refractive power, an aperture stop, and a second subunit having a positive refractive power. A predetermined condition is satisfied.

15 Claims, 5 Drawing Sheets

OPTICAL SYSTEM AND IMAGE PICKUP APPARATUS HAVING THE SAME

BACKGROUND OF THE INVENTION

Field of the Invention

The present invention relates to an optical system, which is suitable for a digital video camera, a digital still camera, a broadcasting camera, a film-based camera, a surveillance camera, and the like.

Description of the Related Art

A compact imaging optical system having a wide angle of view with a half angle of view of about 30 degrees for image pickup apparatus, such as a digital still camera, a video camera, and a film-based camera, has recently been demanded for a bright F-number and a high performance lens. A so-called retro type optical system is generally known as a wide-angle imaging optical system (see Japanese Patent Laid-Open Nos. ("JPs") 2017-97197 and 2013-37223).

The optical systems in JPs 2017-97197 and 2013-37223 are bright retro type optical systems having an F-number of about 1.4, but a brighter retro type optical system is demanded.

SUMMARY OF THE INVENTION

The present invention provides a compact optical system having a high optical performance, and an image pickup apparatus having the same.

An optical system according to one aspect of the present invention consists of, in order from an object side to an image side, a first lens unit having a positive refractive power, and a second lens unit having a positive refractive power. An interval between the first lens unit and the second lens unit changes during focusing. The second lens unit consists of, in order from the object side to the image side, a first subunit having a positive refractive power, an aperture stop, and a second subunit having a positive refractive power. The following conditional expressions are satisfied:

$$2.8 < f2A/f < 6.3$$

$$1.0 < f2/f < 1.9$$

where f2A is a focal length of the first subunit, f2 is a focal length of the second lens unit, and f is a focal length of the optical system.

An optical system according to another aspect of the present invention consists of, in order from an object side to an image side, a first lens unit having a positive refractive power, a second lens unit having a positive refractive power, and a third lens unit having a positive or negative refractive power. Intervals between adjacent lens units change during focusing. The second lens unit consists of, in order from the object side to the image side, a first subunit having a positive refractive power, an aperture stop, and a second subunit having a positive refractive power. The following conditional expressions are satisfied:

$$2.8 < f2A/f < 6.3$$

$$1.0 < f2/f < 1.9$$

where f2A is a focal length of the first subunit, f2 is a focal length of the second lens unit, and f is a focal length of the optical system.

An image pickup apparatus having each of the above optical systems also constitutes another aspect of the present invention.

Further features of the present invention will become apparent from the following description of exemplary embodiments with reference to the attached drawings.

DESCRIPTION OF THE EMBODIMENTS

Figure 1:
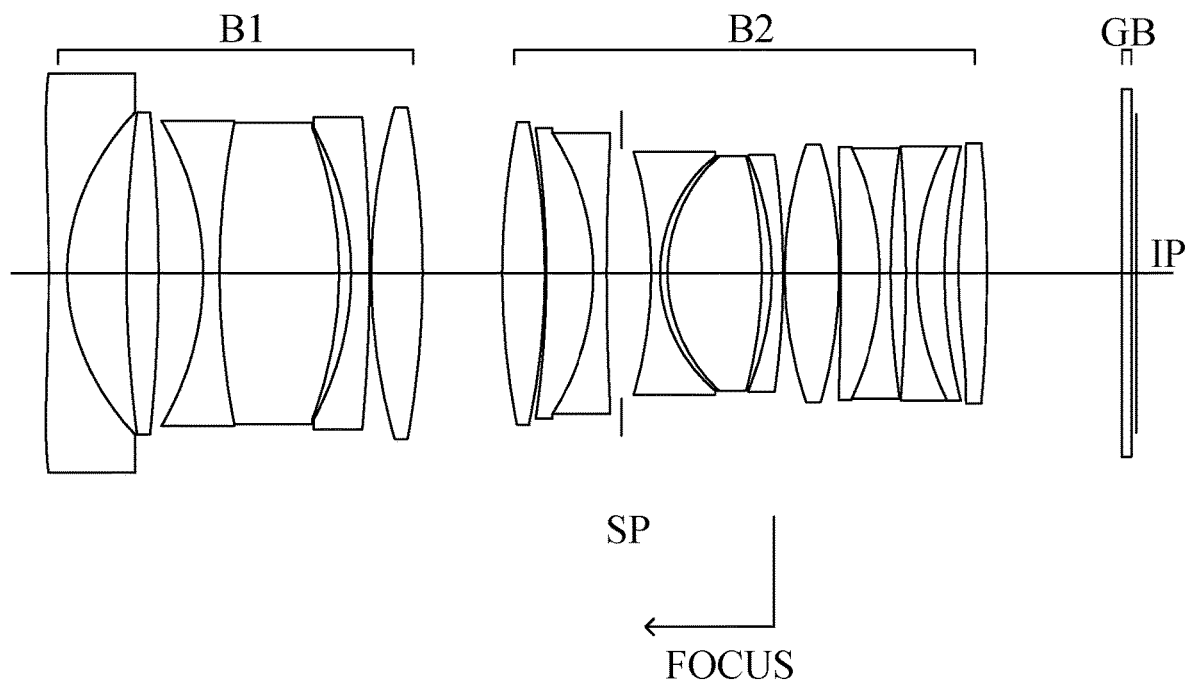
FIG. 1 is a sectional view of an optical system according to Example 1.
Figure 2:
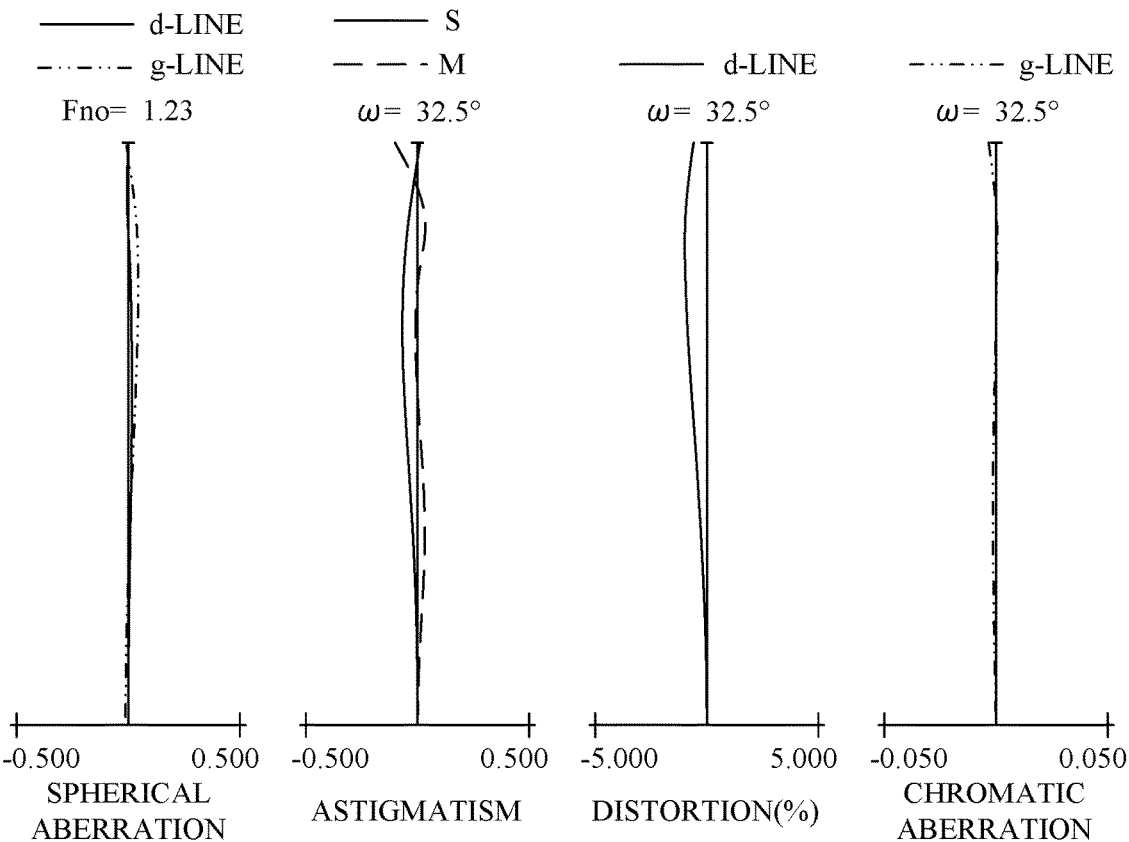
FIG. 2 is an aberration diagram of the optical system according to Example 1 when focused on an object at infinity.
Figure 3:
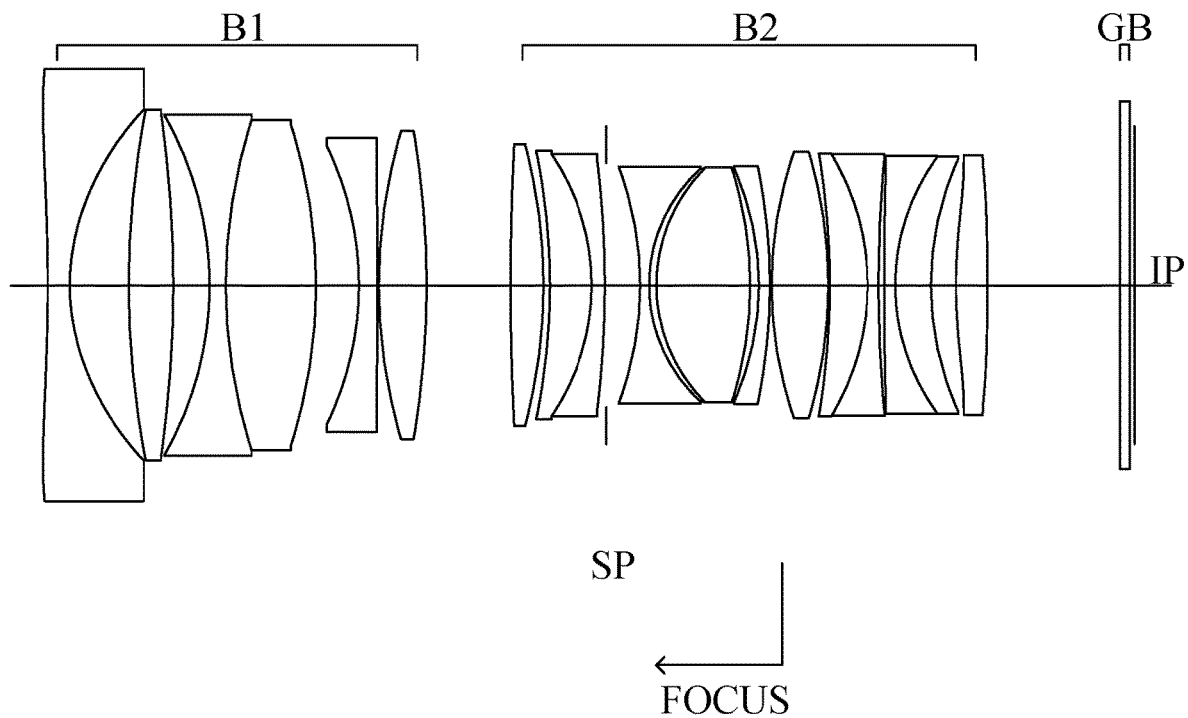
FIG. 3 is a sectional view of an optical system according to Example 2.
Figure 4:
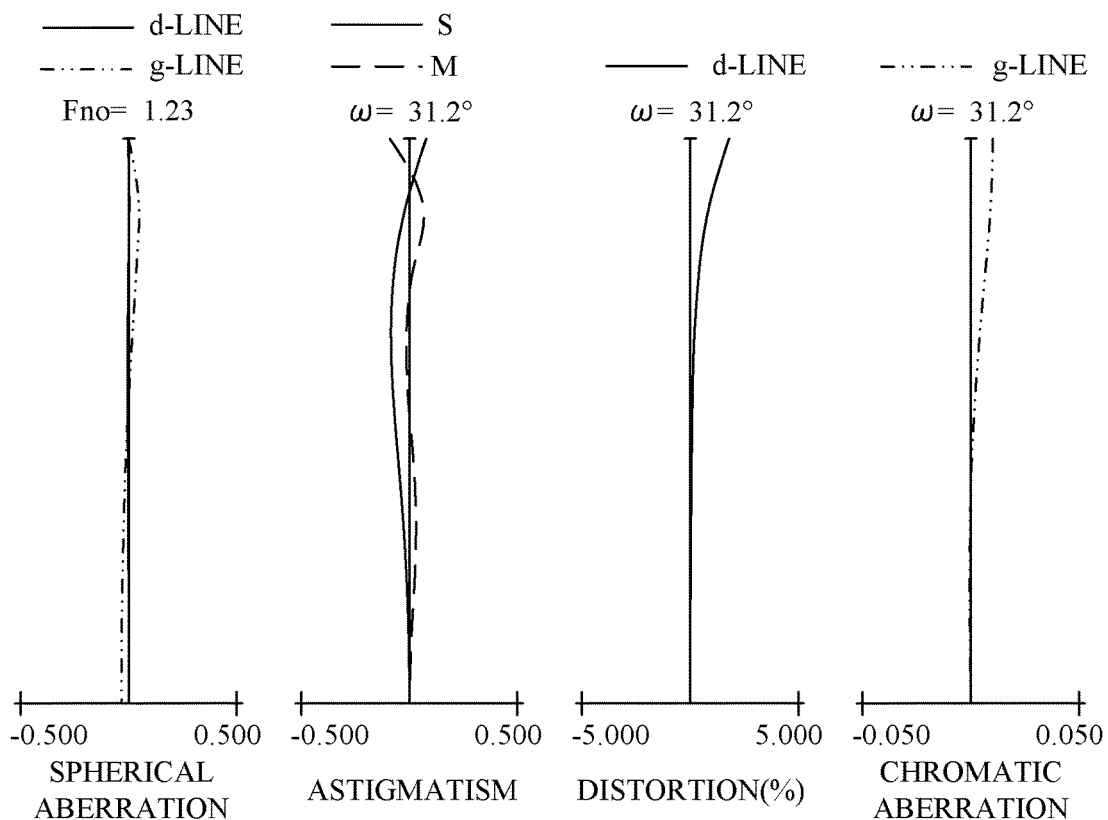
FIG. 4 is an aberration diagram of the optical system according to Example 2 when focused on an object at infinity.
Figure 5:
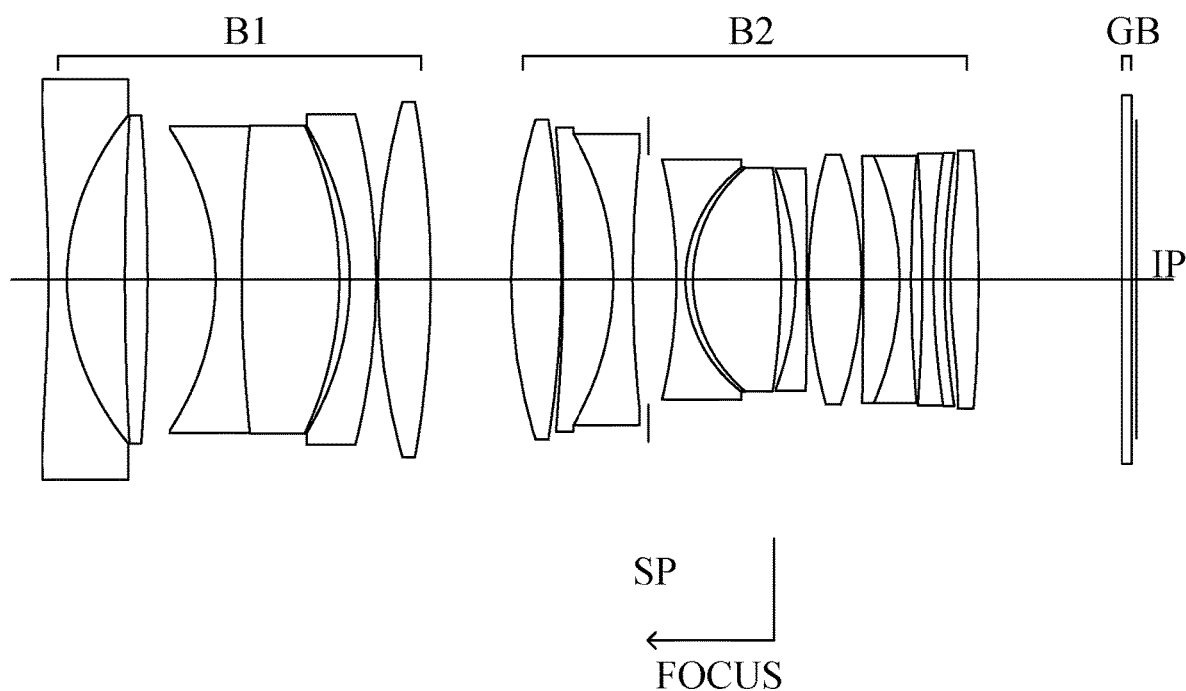
FIG. 5 is a sectional view of an optical system according to Example 3.
Figure 6:
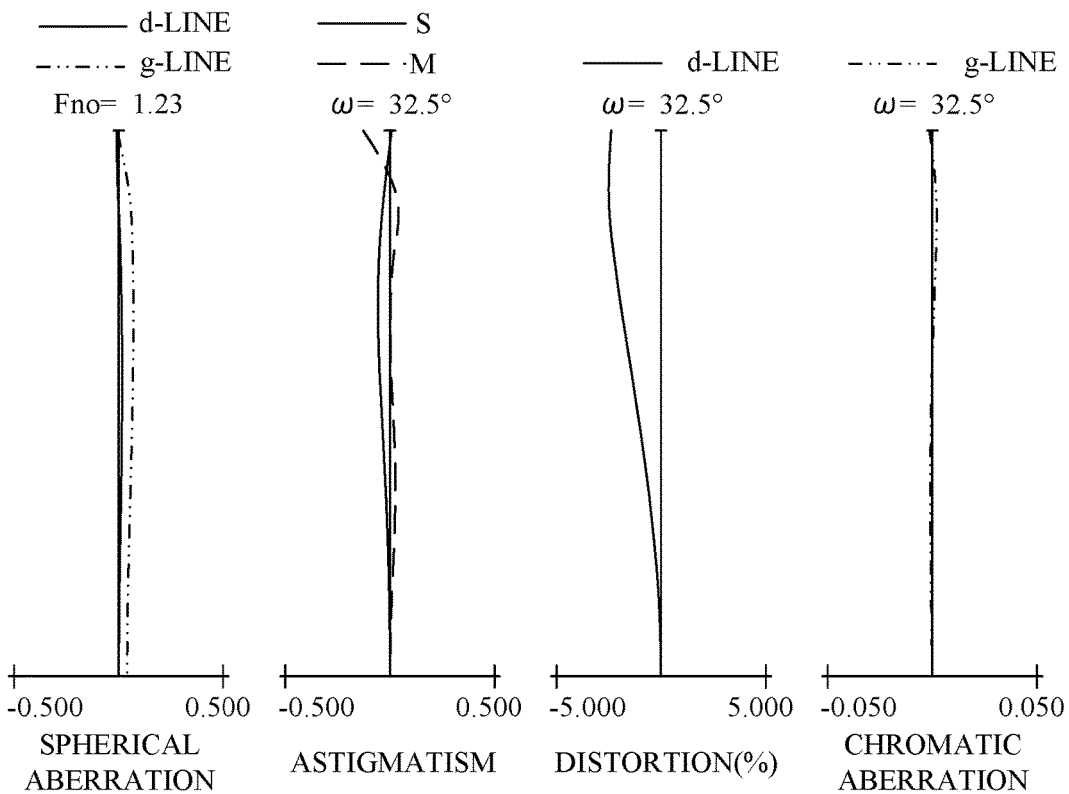
FIG. 6 is an aberration diagram of the optical system according to Example 3 when focused on an object at infinity.
Figure 7:
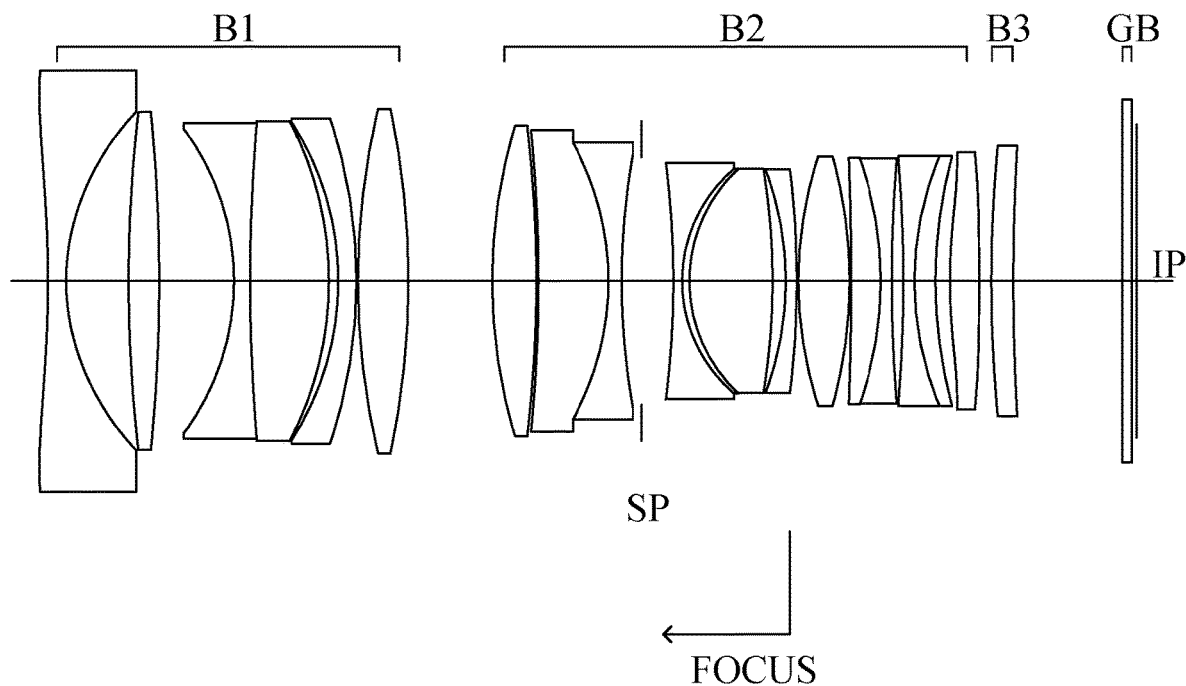
FIG. 7 is a sectional view of an optical system according to Example 4.
Figure 8:
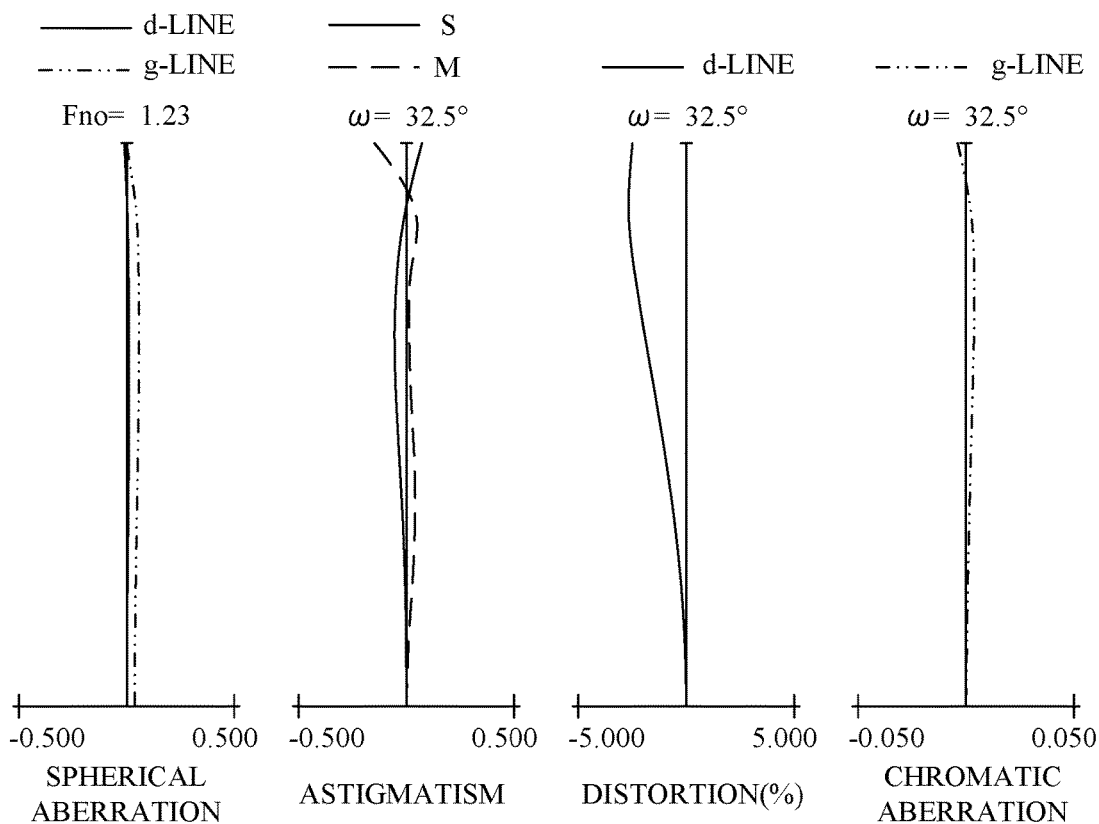
FIG. 8 is an aberration diagram of the optical system according to Example 4 when focused on an object at infinity.

Referring now to the accompanying drawings, a detailed description will be given of embodiments according to the present invention. Corresponding elements in respective figures will be designated by the same reference numerals, and a duplicate description thereof will be omitted.

FIGS. 1, 3, 5, and 7 are sectional views of an optical systems according to Examples 1 to 4, respectively. The optical system according to each example is used for an image pickup apparatus, such as a digital video camera, a digital still camera, a broadcasting camera, a film-based camera, and a surveillance camera. The optical system according to each example is also applicable to a projection optical system for a projection apparatus (projector).

In each cross section, a left side is the object side (front) and a right side is the image side (rear). The optical system according to each example has a plurality of lens units. In the instant specification, the lens unit is a group of lenses that move or stand still integrally during focusing. That is, in the optical system according to each example, intervals between adjacent lens units changes during focusing from infinity to a short distance. The lens unit may include one or more lenses. The lens unit may include an aperture stop (diaphragm).

In each cross sectional view, Bi represents an i-th lens unit (i is a natural number) among the lens units included in the optical system counted from the object side. SP represents an aperture stop. GB is an optical block corresponding to an optical filter, a face plate, a low-pass filter, an infrared cut filter, or the like. IP is an image plane, and when the optical system according to each example is used for an imaging optical system in a digital still camera or a digital video camera, an imaging plane of a solid state image sensor (photoelectric conversion element), such as a CCD sensor or a CMOS sensor, is placed on the image plane IP. When the optical system according to each example is used for an imaging optical system in a film-based camera, a photosensitive plane corresponding to the film plane is placed on the image plane IP.

An arrow shown in each cross section shows a moving direction of the lens unit during focusing from infinity to the short distance.

FIGS. 2, 4, 6 and 8 are aberration diagrams of the optical systems according to Examples 1 to 4 when focused on an object at infinity, respectively.

In the aberration diagram, Fno represents an F-number, ω represents a half angle of view (degree), which is an angle of view according to ray tracing value. The spherical aberration diagram shows spherical aberration amounts for the d-line (wavelength 587.6 nm) and the g-line (wavelength 435.8 nm). In the astigmatism diagram, S is a sagittal image plane for the d-line and M is a meridional image plane for the d-line. The distortion diagram shows a distortion amount for the d-line. The chromatic aberration diagram shows a chromatic aberration amount for the g-line.

The optical system according to the present invention includes, in order from the object side to the image side, a first lens unit B1 having a positive refractive power and a second lens unit B2 having a positive refractive power, and intervals between adjacent lens units changes during focusing. The optical system according to the present invention may further include a third lens unit having a positive or negative refractive power on the image side of the second lens unit. The refractive power is an optical power and is represented by a reciprocal of the focal length.

The optical system according to each example has a bright F-number and a wide angle of view, such as an aperture ratio of about 1.23 and a half angle of view of about 32 degrees. Each of the optical systems according to Examples 1 to 3 includes (or consists of), in order from the object side to the image side, a first lens unit B1 having a positive refractive power, and a second lens unit B2 having a positive refractive power. During focusing, the first lens unit B1 is fixed (or does not move), and the second lens unit B2 moves along the optical axis. The optical system according to Example 4 includes, in order from the object side to the image side, a first lens unit B1 having a positive refractive power, a second lens unit B2 having a positive refractive power, and a third lens unit B3 having a positive or negative refractive power. During focusing, the first lens unit B1 and the third lens unit B3 are fixed (or do not move), and the second lens unit B2 moves on the optical axis.

During focusing, fixing the first lens unit B1 which is heavy among all lens units and moving the second lens unit B2 can simplify a mechanical configuration such as a motor necessary for the focusing operation. This configuration is suitable for a compact optical system.

In the optical system according to each example, the second lens unit B2 includes (or consists of), in order from the object side to the image side, the first subunit (2A-th lens unit) having a positive refractive power, the aperture stop SP, and a second partial lens unit (2B-th lens unit) having a positive refractive power. Disposing the aperture stop SP on the image side of the first subunit having a positive refractive power can make compact the dimeter of the aperture stop SP in the optical system, and can make compact the optical system.

The following conditional expressions (1) and (2) are satisfied:

$$2.8 < f2A/f < 6.3 \quad (1)$$

$$1.0 < f2/f < 1.9 \quad (2)$$

where f2A is a focal length of the first subunit, f2 is a focal length of the second lens unit B2, and f is a focal length of the optical system.

The conditional expression (1) defines a proper range of a ratio between the focal length f2A of the first subunit and the focal length f of the optical system. If the focal length f2A of the first subunit becomes larger so that the value is higher than the upper limit in the conditional expression (1), the aberrations would be easily suppressed, but the converging effect of the first subunit would lower, the aperture diameter and consequently the size of the optical system would increase. If the focal length f2A of the first subunit becomes smaller so that the value is lower than the lower limit in the conditional expression (1), the desired miniaturization effect would be easily available but it would be difficult to correct particularly the spherical aberration.

The conditional expression (2) defines a proper range of a ratio between the focal length f2 of the second lens unit B2 and the focal length f of the optical system. If the focal length f2 of the second lens unit B2 becomes larger so that the value is higher than the upper limit in the conditional expression (2), the aberrations would be easily suppressed, but the moving amount of the second lens unit B2 during focusing and consequently the size of the system would increase. If the focal length f2 of the second lens unit B2 becomes smaller so that the value is lower than the lower limit in the conditional expression (2), the desired miniaturization effect would be easily available but it would be difficult to correct various aberrations in association with focusing.

Satisfying the conditional expressions (1) and (2) can provide a higher performance and a compact size.

The following conditional expression (3) may be satisfied:

$$3.0 < f1/f < 5.0 \quad (3)$$

where f1 is a focal length of the first lens unit B1.

The conditional expression (3) defines a proper range of a ratio between the focal length f1 of the first lens unit B1 and the focal length f of the optical system. If the focal length f1 of the first lens unit B1 becomes larger so that the value is higher than the upper limit in the conditional expression (3), the aberrations would be easily suppressed, but the moving amount of the second lens unit B2 during focusing and consequently the size of the system would increase. If the focal length f1 of the first lens unit B1 becomes smaller so that the value is lower than the lower limit in the conditional expression (3), the desired miniaturization effect would be easily available but it would be difficult to correct particularly the curvature of field.

The following conditional expression (4) may be satisfied:

$$4.0 < f2A/sk < 13.0 \quad (4)$$

where sk is a backfocus.

The conditional expression (4) defines a proper range of a ratio between the focal length f2A of the first subunit and the backfocus sk. If the focal length f2A of the first subunit becomes larger so that the value is higher than the upper limit in the conditional expression (4), the aberrations would be easily suppressed but the converging effect of the first subunit would decrease and the aperture diameter and consequently the size of the optical system would increase. If the focal length f2A of the first subunit becomes smaller so that the value is lower than the lower limit in the conditional expression (4), the desired miniaturization effect would be easily available but it would be difficult to correct particularly the spherical aberration.

The following conditional expression (5) may be satisfied:

$$2.5 < f2B/sk < 4.5 \quad (5)$$

where f2B is a focal length of the second subunit.

The conditional expression (5) defines a proper range of a ratio between the focal length f2B of the second subunit and the backfocus sk. When the focal length f2B of the second subunit becomes larger so that the value is higher than the upper limit in the conditional expression (5), the aberrations would be easily suppressed, but the moving amount of the second lens unit B2 during focusing and consequently the size of the optical system would increase. If the focal length f2B of the second subunit becomes smaller so that the value is lower than the lower limit in the conditional expression (5), the desired miniaturization effect would be easily available but it would be difficult to correct particularly the spherical aberration and curvature of field.

The following conditional expression (6) may be satisfied:

$$1.0 < f1D/f < 2.0 \quad (6)$$

where f1D is a distance on the optical axis from a lens surface closest to the object of the first lens unit B1 to a lens surface closest to the image plane.

The conditional expression (6) defines a proper range or a ratio between the distance f1D on the optical axis from the lens surface closest to the object to the lens surface closest to the image plane of the first lens unit B1 and the focal length f of the optical system. If the distance f1D on the optical axis from the lens surface closest to the object to the lens surface closest to the image plane of the first lens unit B1 becomes larger so that the value is higher than the upper limit in the conditional expression (6), it would be difficult to realize a compact structure. If the distance f1D on the optical axis from the lens surface closest to the object to the lens surface closest to the image plane of the first lens unit B1 is smaller so that the value is lower than the lower limit in the conditional expression (6), the desired compact structure would be easily available but it would be difficult to correct particularly the curvature of field and the lateral chromatic aberration.

The following conditional expression (7) may be satisfied:

$$2.0 < f1D/sk < 3.5 \quad (7)$$

The conditional expression (7) defines a proper range of a ratio between the distance f1D on the optical axis from the lens surface closest to the object to the lens surface closest to the image plane of the first lens unit B1 and the backfocus sk. If the distance f1D on the optical axis from the lens surface closest to the object to the lens surface closest to the image plane of the first lens unit B1 is larger so that the value is higher than the upper limit in the conditional expression (7), it would be difficult to realize a compact structure. If the distance f1D on the optical axis from the lens surface closest to the object to the lens surface closest to the image plane of the first lens unit B1 is smaller so that the value is lower than the lower limit in the conditional expression (7), the desired miniaturization effect would be available but it would be difficult to correct particularly the curvature of field and the lateral chromatic aberration.

The following conditional expression (8) may be satisfied:

$$0.3 < f2AD/f < 0.6 \quad (8)$$

where f2AD is a distance on the optical axis from a lens surface closest to the object of the first subunit to a lens surface closest to the image plane of the first subunit.

The conditional expression (8) defines a proper range of a ratio between the distance f2AD on the optical axis from the lens surface closest to the object to the lens surface to the image plane of the first subunit and the focal length f of the optical system. If the distance f2AD on the optical axis from the lens surface closest to the object to the lens surface closest to the image plane of the first subunit is larger so that the value is higher than the upper limit in the conditional expression (8), it would be difficult to realize a compact structure. If the distance f2AD on the optical axis from the lens surface closest to the object to the lens surface closest to the image plane of the first subunit is smaller so that the value is lower than the lower limit in the conditional expression (8), the desired miniaturization effect would be easily available but it would be difficult to correct particularly the spherical aberration.

The following conditional expression (9) may be satisfied:

$$1.1 < f2BD/f < 1.4 \quad (9)$$

where f2BD is a distance on the optical axis from a lens surface closest to the object of the second subunit to a lens surface closest to the image plane of the second subunit.

The conditional expression (9) defines a proper range of a ratio between the distance f2BD on the optical axis from the lens surface closest to the object to the lens surface closest to the image plane of the second subunit and the focal length f of the optical system. If the distance f2BD on the optical axis from the lens surface closest to the object to the lens surface closest to the image plane of the second subunit becomes larger so that the value is higher than the upper limit in the conditional expression (9), it would be difficult to realize a compact structure. If the distance f2BD on the optical axis from the lens surface closest to the object to the lens surface closest to the image plane of the second subunit is smaller so that the value is lower than the lower limit in the conditional expression (9), the compact structure would be easily available but it would be difficult to correct particularly the curvature of field and the lateral chromatic aberration.

The following conditional expression (10) may be satisfied:

$$1.8 < f1/f2 < 3.0 \quad (10)$$

The conditional expression (10) defines a proper range of a ratio between the focal length f1 of the first lens unit B1 and the focal length f2 of the second lens unit B2. If the focal length f1 of the first lens unit B1 becomes larger so that the value is higher than the upper limit in the conditional expression (10), it would be easy to correct various aberrations, but the diameter of the first lens unit B1 would be larger and consequently it would be difficult to realize a compact structure. If the focal length f1 of the first lens unit B1 becomes smaller so that the value is lower than the lower limit in the conditional expression (10), the desired miniaturization effect would be easily available but it would be difficult to correct particularly the curvature of field and the lateral chromatic aberration.

At least one surface of the lens closest to the object may be aspherical. This configuration is effective in correcting the distortion and the curvature of field.

Both surfaces of the first lens closest to the object may be aspherical. This configuration is effective in correcting the distortion and the curvature of field.

The first subunit may include three lenses including a positive lens, and the following conditional expression may be satisfied:

$$60 < vd2A < 100 \quad (11)$$

where vd2A is an Abbe number of the positive lens.

The conditional expression (11) defines a proper range of the Abbe number of the positive lens included in the first subunit. Disposing a low-dispersion material that satisfies the conditional expression (11) is effective in satisfactorily correcting the longitudinal chromatic aberration.

The numerical ranges of the conditional expressions (1) to (11) may be replaced with those in the following conditional expressions (1a) to (11a).

$$2.95 < f2A/f < 6.10 \quad (1a)$$

$$1.20 < f2/f < 1.85 \quad (2a)$$

$$3.3 < f1/f < 4.5 \quad (3a)$$

$$4.3 < f2A/sk < 12.7 \quad (4a)$$

$$2.8 < f2B/sk < 4.2 \quad (5a)$$

$$1.2 < f1D/f < 1.8 \quad (6a)$$

$$2.2 < f1D/sk < 3.3 \quad (7a)$$

$$0.33 < f2AD/f < 0.57 \quad (8a)$$

$$1.15 < f2BD/f < 1.37 \quad (9a)$$

$$1.9 < f1/f2 < 2.9 \quad (10a)$$

$$70 < Vd2A < 90 \quad (11a)$$

The numerical ranges of the conditional expressions (1) to (11) may be replaced with those in the following conditional expressions (1b) to (11b).

$$3.0 < f2A/f < 6.0 \quad (1b)$$

$$1.35 < f2/f < 1.82 \quad (2b)$$

$$3.4 < f1/f < 4.2 \quad (3b)$$

$$4.6 < f2A/sk < 12.4 \quad (4b)$$

$$3.0 < f2B/sk < 4.0 \quad (5b)$$

$$1.35 < f1D/f < 1.60 \quad (6b)$$

$$2.4 < f1D/sk < 3.1 \quad (7b)$$

$$0.35 < f2AD/f < 0.53 \quad (8b)$$

$$1.18 < f2BD/f < 1.35 \quad (9b)$$

$$1.95 < f1/f2 < 2.85 \quad (10b)$$

$$73 < Vd2A < 80 \quad (11b)$$

As described above, each example can realize a compact optical system that has an F-number brighter than 1.3 and a high optical performance.

Numerical examples 1 to 4 corresponding to Examples 1 to 4 will be shown below.

In the surface data according to each numerical example, r represents a radius of curvature of each optical surface, and d (mm) represents an axial distance (distance on the optical axis) between an m-th surface and an (m+1)th surface, where m is a surface number counted from the light incident side. Further, nd represents a refractive index of each optical element for the d-line, and vd represents an Abbe number of the optical element. The Abbe number vd of a certain material is expressed as follows, where Nd, NF, and NC are refractive indexes for the d-line (587.6 nm), the F-line (486.1 nm), and the C-line (656.3 nm) in the Fraunhofer line:

$$vd = (Nd-1)/(NF-NC)$$

In each numerical example, values of d, a focal length (mm), an F-number, and a half angle of view(° are those when the zoom lens according to each example is focused on an object at infinity. "BF" (backfocus) is a distance on the optical axis from the final lens surface (lens surface closest to the image plane) to the paraxial image plane, which is expressed by an air converted length. An "overall lens length" is a length obtained by adding the backfocus to a distance on the optical axis from the frontmost lens surface (lens surface closest to the object) to the final surface of the zoom lens. The "lens unit" is not limited to a plurality of lenses, but may consist of a single lens.

When the optical surface is an aspherical surface, the symbol * is added to the right shoulder of the surface number. The aspherical shape is expressed as follows:

$$X = (h^2/R)/[1+\{1-(1+k)(h/R)^2\}^{1/2} + A4 \times h^4 + A6 \times h^6 + A8 \times h^8 + A10 \times h^{10}]$$

where X is a displacement amount from the surface vertex in the optical axis direction, h is a height from the optical axis in the direction orthogonal to the optical axis, R is a paraxial radius of curvature, k is a conical constant, A4, A6, When A8 and A10 are aspherical coefficients of each order. "e±XX" in each aspherical surface coefficient means "$\times 10^{\pm XX}$".

Numerical Example 1

UNIT mm
Surface data

| surface number | r | d | nd | vd |
|---|---|---|---|---|
| 1* | −291.138 | 2.50 | 1.48749 | 70.2 |
| 2* | 28.268 | 8.06 | | |
| 3 | 166.122 | 4.37 | 1.88300 | 40.8 |
| 4 | −205.770 | 6.06 | | |
| 5 | −40.823 | 2.20 | 1.57501 | 41.5 |
| 6 | 105.778 | 16.34 | 1.88300 | 40.8 |
| 7 | −55.541 | 1.62 | | |
| 8 | −41.251 | 2.50 | 1.69895 | 30.1 |
| 9 | −227.662 | 0.20 | | |
| 10 | 80.371 | 7.02 | 1.83481 | 42.7 |
| 11 | −123.358 | 10.77 | | |
| 12 | 106.282 | 5.82 | 1.91082 | 35.3 |

-continued

| | UNIT mm<br>Surface data | | | |
|---|---|---|---|---|
| 13 | −98.258 | 0.20 | | |
| 14 | −135.080 | 6.45 | 1.53775 | 74.7 |
| 15 | −35.249 | 1.80 | 1.66565 | 35.6 |
| 16 | 333.514 | 2.04 | | |
| 17(stop) | ∞ | 4.03 | | |
| 18 | −58.404 | 1.20 | 1.66565 | 35.6 |
| 19 | 20.739 | 1.00 | 1.60401 | 20.8 |
| 20 | 21.666 | 12.82 | 1.59522 | 67.7 |
| 21 | −60.626 | 1.38 | | |
| 22 | −41.075 | 1.50 | 1.66565 | 35.6 |
| 23 | −114.441 | 0.20 | | |
| 24 | 53.695 | 7.43 | 1.91082 | 35.3 |
| 25 | −62.165 | 0.20 | | |
| 26 | −491.244 | 5.36 | 1.53775 | 74.7 |
| 27 | −39.325 | 1.50 | 1.66565 | 35.6 |
| 28 | 121.753 | 2.08 | | |
| 29 | −201.558 | 1.50 | 1.66565 | 35.6 |
| 30 | 38.683 | 3.70 | 1.91082 | 35.3 |
| 31 | 67.666 | 1.94 | | |
| 32* | 72.504 | 3.84 | 1.85400 | 40.4 |
| 33* | −240.907 | 18.33 | | |
| 34 | ∞ | 1.30 | 1.55900 | 60.0 |
| 35 | ∞ | 0.66 | | |
| image plane | ∞ | | | |

ASPHERIC DATA first surface
K = 0.00000e+000 A 4 = 1.93985e−006 A 6 = −5.90058e−010 A 8 = 1.37812e−012
second surface
K = 0.00000e+000 A 4 = −3.17484e−006 A 6 = −4.46107e−009 A 8 = 6.68835e−013
thirty-second surface
K = 0.00000e+000 A 4 = −7.62588e−006 A 6 = −1.04850e−008 A 8 = −1.12851e−010
A10 = 3.25087e−013
thirty-third surface
K = 0.00000e+000 A 4 = 2.00325e−006 A 6 = −8.08877e−009 A 8 = −1.03389e−010
A10 = 3.22321e−013

| | |
|---|---|
| Focal length | 34.00 |
| F-NUMBER | 1.23 |
| Half angle of view (degree) | 32.47 |
| Image height | 21.64 |
| Overall lens length | 147.45 |
| BF | 19.82 |

| LENS UNIT DATA | | |
|---|---|---|
| Unit | Starting surface | Focal length |
| 1 | 1 | 137.51 |
| 2 | 12 | 53.83 |

Numerical Example 2

| | UNIT mm<br>Surface data | | | |
|---|---|---|---|---|
| surface number | r | d | nd | vd |
| 1* | −243.304 | 3.00 | 1.48749 | 70.2 |
| 2* | 30.394 | 8.01 | | |
| 3 | 125.030 | 6.06 | 1.88300 | 40.8 |
| 4 | −164.273 | 4.92 | | |
| 5 | −46.678 | 2.20 | 1.57501 | 41.5 |
| 6 | 73.533 | 12.37 | 1.88300 | 40.8 |
| 7 | −71.171 | 5.80 | | |
| 8 | −43.459 | 2.50 | 1.67270 | 32.1 |
| 9 | −2116.350 | 0.20 | | |
| 10 | 73.937 | 6.51 | 1.83481 | 42.7 |
| 11 | −125.281 | 11.40 | | |
| 12 | 374.914 | 4.50 | 1.90043 | 37.4 |
| 13 | −74.077 | 0.87 | | |

-continued

|  | UNIT mm Surface data | | | |
|---|---|---|---|---|
| 14 | −89.448 | 5.74 | 1.53775 | 74.7 |
| 15 | −31.579 | 1.80 | 1.66565 | 35.6 |
| 16 | −137.953 | 0.20 | | |
| 17(stop) | ∞ | 4.59 | | |
| 18 | −46.163 | 1.20 | 1.66565 | 35.6 |
| 19 | 21.459 | 1.00 | 1.60401 | 20.8 |
| 20 | 22.576 | 12.74 | 1.59522 | 67.7 |
| 21 | −52.156 | 1.20 | | |
| 22 | −39.117 | 1.50 | 1.66565 | 35.6 |
| 23 | −78.750 | 0.20 | | |
| 24 | 55.140 | 7.75 | 1.95375 | 32.3 |
| 25 | −62.638 | 0.20 | | |
| 26 | −106.367 | 5.16 | 1.60300 | 65.4 |
| 27 | −34.500 | 1.50 | 1.63980 | 34.5 |
| 28 | 184.058 | 0.79 | | |
| 29 | 628.441 | 1.50 | 1.67270 | 32.1 |
| 30 | 29.606 | 4.84 | 1.95375 | 32.3 |
| 31 | 41.683 | 3.40 | | |
| 32* | 69.868 | 4.29 | 1.85400 | 40.4 |
| 33* | −294.048 | 18.00 | | |
| 34 | ∞ | 1.30 | 1.55900 | 60.0 |
| 35 | ∞ | 0.66 | | |
| image plane | ∞ | | | |

ASPHERIC DATA first surface
K = 0.00000e+000 A 4 = 1.65538e−006 A 6 = −4.91395e−010 A 8 = 8.01708e−013
second surface
K = 0.00000e+000 A 4 = −3.13244e−006 A 6 = −2.68424e−009 A 8 = −5.37804e−013
thirty-second surface
K = 0.00000e+000 A 4 = −7.04416e−006 A 6 = −1.14087e−008 A 8 = −1.16799e−010
A10 = 3.26239e−013
thirty-third surface
K = 0.00000e+000 A4 = 1.94361e−006 A 6 = −1.13739e−008 A 8 = −9.55862e−011
A10 = 3.14967e−013

| | |
|---|---|
| Focal length | 35.76 |
| F-NUMBER | 1.23 |
| Half angle of view (degree) | 31.17 |
| Image height | 21.64 |
| Overall lens length | 147.45 |
| BF | 19.50 |

| LENS UNIT DATA | | |
|---|---|---|
| Unit | Starting surface | Focal length |
| 1 | 1 | 139.35 |
| 2 | 12 | 49.79 |

Numerical Example 3

| | UNIT mm Surface data | | | |
|---|---|---|---|---|
| surface number | r | d | nd | vd |
| 1* | −200.6278 | 2.50 | 1.48749 | 70.2 |
| 2* | 32.302 | 7.87 | | |
| 3 | 407.220 | 3.09 | 1.88300 | 40.8 |
| 4 | −283.116 | 9.23 | | |
| 5 | −36.919 | 3.52 | 1.54814 | 45.8 |
| 6 | 193.736 | 13.39 | 1.88300 | 40.8 |
| 7 | −48.721 | 1.41 | | |
| 8 | −39.862 | 3.58 | 1.78472 | 25.7 |
| 9 | −90.630 | 0.20 | | |
| 10 | 88.840 | 7.20 | 1.83481 | 42.7 |
| 11 | −136.601 | 10.90 | | |
| 12 | 72.719 | 6.82 | 1.88300 | 40.8 |
| 13 | −134.794 | 0.20 | | |
| 14 | −230.141 | 6.94 | 1.53775 | 74.7 |

-continued

| | UNIT mm Surface data | | | |
|---|---|---|---|---|
| 15 | −38.462 | 2.62 | 1.66565 | 35.6 |
| 16 | 163.474 | 2.13 | | |
| 17(stop) | ∞ | 3.84 | | |
| 18 | −68.310 | 1.20 | 1.66565 | 35.6 |
| 19 | 19.157 | 1.00 | 1.60401 | 20.8 |
| 20 | 19.879 | 11.99 | 1.59522 | 67.7 |
| 21 | −99.232 | 2.01 | | |
| 22 | −41.910 | 1.50 | 1.66565 | 35.6 |
| 23 | −669.650 | 0.20 | | |
| 24 | 62.047 | 7.24 | 1.95375 | 32.3 |
| 25 | −51.659 | 0.20 | | |
| 26 | −1006.555 | 5.05 | 1.49700 | 81.5 |
| 27 | −41.718 | 1.50 | 1.69895 | 30.1 |
| 28 | 182.894 | 1.56 | | |
| 29 | −242.870 | 1.50 | 1.60342 | 38.0 |
| 30 | 111.244 | 1.51 | 1.85896 | 22.7 |
| 31 | 111.695 | 0.81 | | |
| 32* | 74.477 | 3.81 | 1.85400 | 40.4 |
| 33* | −262.535 | 19.46 | | |
| 34 | ∞ | 1.30 | 1.55900 | 60.0 |
| 35 | ∞ | 0.66 | | |
| image plane | ∞ | | | |

ASPHERIC DATA first surface
K = 0.00000e+000 A 4 = 1.40003e−006 A 6 = 1.43452e−010 A 8 = 7.93768e−013
second surface
K = 0.00000e+000 A 4 = −1.79587e−006 A 6 = −2.98375e−009 A 8 = 2.99392e−012
thirty-second surface
K = 0.00000e+000 A 4 = −7.48301e−006 A 6 = −2.39211e−010 A 8 = −1.60827e−010
A10 = 3.87480e−013
thirty-third surface
K = 0.00000e+000 A 4 = 1.25080e−006 A 6 = 5.00161e−009 A 8 = −1.60849e−010
A10 = 3.94729e−013

| | |
|---|---|
| Focal length | 34.00 |
| F-NUMBER | 1.23 |
| Half angle of view (degree) | 32.47 |
| Image height | 21.64 |
| Overall lens length | 147.45 |
| BF | 20.95 |

| LENS UNIT DATA | | |
|---|---|---|
| Unit | Starting surface | Focal length |
| 1 | 1 | 119.64 |
| 2 | 12 | 59.51 |

Numerical Example 4

| | UNIT mm Surface data | | | |
|---|---|---|---|---|
| surface number | r | d | nd | vd |
| 1* | −155.827 | 2.50 | 1.48749 | 70.2 |
| 2* | 30.791 | 8.58 | | |
| 3 | 203.527 | 4.22 | 1.88300 | 40.8 |
| 4 | −235.444 | 10.28 | | |
| 5 | −35.286 | 2.20 | 1.65412 | 39.7 |
| 6 | 257.425 | 10.93 | 1.88300 | 40.8 |
| 7 | −47.570 | 1.28 | | |
| 8 | −40.647 | 2.50 | 1.80518 | 25.4 |
| 9 | −70.753 | 0.20 | | |
| 10 | 102.944 | 6.95 | 1.83481 | 42.7 |
| 11 | −114.773 | 11.50 | | |
| 12 | 74.350 | 6.09 | 1.85150 | 40.8 |
| 13 | −178.888 | 0.29 | | |
| 14 | −210.368 | 9.70 | 1.53775 | 74.7 |
| 15 | −39.263 | 1.81 | 1.66565 | 35.6 |

-continued

UNIT mm
Surface data

| | | | | |
|---|---|---|---|---|
| 16 | 98.428 | 2.73 | | |
| 17(stop) | ∞ | 4.39 | | |
| 18 | −128.906 | 1.20 | 1.66565 | 35.6 |
| 19 | 20.291 | 1.00 | 1.60401 | 20.8 |
| 20 | 21.090 | 11.43 | 1.59522 | 67.7 |
| 21 | −95.183 | 1.83 | | |
| 22 | −43.439 | 1.52 | 1.66565 | 35.6 |
| 23 | −121.074 | 0.20 | | |
| 24 | 55.022 | 7.06 | 1.95375 | 32.3 |
| 25 | −63.321 | 0.20 | | |
| 26 | −453.193 | 4.16 | 1.49700 | 81.5 |
| 27 | −49.717 | 1.50 | 1.69895 | 30.1 |
| 28 | 199.954 | 1.61 | | |
| 29 | −199.896 | 1.50 | 1.64769 | 33.8 |
| 30 | 44.386 | 2.90 | 1.88300 | 40.8 |
| 31 | 65.502 | 1.99 | | |
| 32* | 73.742 | 4.02 | 1.85400 | 40.4 |
| 33* | −451.770 | 1.68 | | |
| 34 | 200.774 | 3.00 | 1.72916 | 54.7 |
| 35 | 317.592 | 15.00 | | |
| 36 | ∞ | 1.30 | 1.55900 | 60.0 |
| 37 | ∞ | 0.66 | | |
| image plane | ∞ | | | |

ASPHERIC DATA first surface
K = 0.00000e+000 A 4 = 1.90556e−006 A 6 = −3.41974e−011 A 8 = 6.30171e−013
second surface
K = 0.00000e+000 A 4 = −2.51957e−006 A 6 = −2.91073e−009 A 8 = 1.39400e−012
thirty-second surface
K = 0.00000e+000 A 4 = −6.53142e−006 A 6 = −1.67754e−008 A 8 = −9.20420e−011
A10 = 2.98649e−013
thirty-third surface
K = 0.00000e+000 A 4 = 1.86090e−006 A 6 = −1.46972e−008 A 8 = −8.40862e−011
A10 = 2.93268e−013

| | |
|---|---|
| Focal length | 34.00 |
| F-NUMBER | 1.23 |
| Half angle of view (degree) | 32.47 |
| Image height | 21.64 |
| Overall lens length | 149.45 |
| BF | 16.49 |

LENS UNIT DATA

| Unit | Starting surface | Focal length |
|---|---|---|
| 1 | 1 | 122.62 |
| 2 | 12 | 60.87 |
| 3 | 34 | 740.57 |

Table 1 below summarizes various values in each numerical example.

TABLE 1

| | | | Example | | | |
|---|---|---|---|---|---|---|
| | | | 1 | 2 | 3 | 4 |
| | | F2A | 115.968 | 107.554 | 102.454 | 202.979 |
| | | F2B | 64.458 | 62.793 | 75.816 | 63.523 |
| | | F1 | 137.509 | 139.352 | 119.643 | 112.617 |
| | | F2 | 53.832 | 49.786 | 59.506 | 60.867 |
| | | F1D | 50.869 | 51.572 | 51.975 | 49.645 |
| | | F2D | 65.992 | 64.985 | 63.622 | 67.123 |
| | | F2AD | 14.271 | 12.909 | 16.583 | 17.884 |
| | | F2BD | 45.651 | 47.282 | 41.062 | 42.120 |
| Conditional | (1) | F2A/f | 3.411 | 3.007 | 3.013 | 5.970 |
| Expression | (2) | F2/f | 1.583 | 1.392 | 1.750 | 1.790 |
| | (3) | F1/f | 4.044 | 3.897 | 3.519 | 3.606 |
| | (4) | F2A/sk | 5.851 | 5.516 | 4.889 | 12.306 |
| | (5) | F2B/sk | 3.252 | 3.221 | 3.618 | 3.851 |

TABLE 1-continued

|  |  | Example | | | |
|---|---|---|---|---|---|
|  |  | 1 | 2 | 3 | 4 |
| (6) | F1D/f | 1.496 | 1.442 | 1.529 | 1.460 |
| (7) | F1D/sk | 2.567 | 2.645 | 2.480 | 3.010 |
| (8) | F2AD/f | 0.420 | 0.361 | 0.488 | 0.526 |
| (9) | F2BD/f | 1.343 | 1.322 | 1.208 | 1.239 |
| (10) | F1/F2 | 2.554 | 2.799 | 2.011 | 2.015 |
| (11) | Vd2A | 74.700 | 74.700 | 74.700 | 74.700 |

Image Pickup Apparatus

Figure 9:
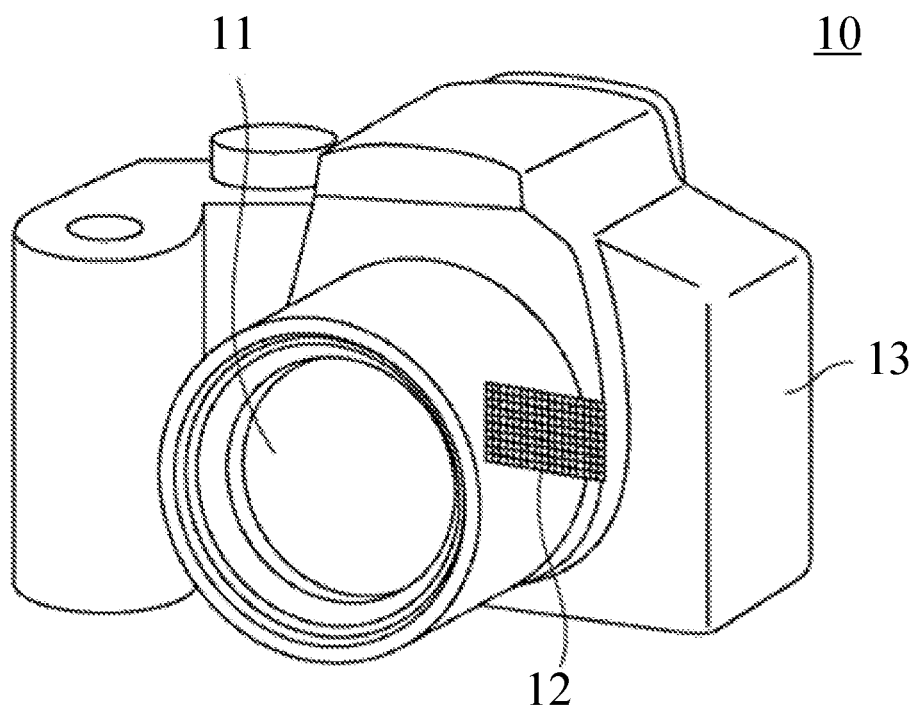
FIG. 9 is a schematic diagram of main part of an image pickup apparatus according to the present invention.

Referring now to FIG. 9, a description will be given of an embodiment of a digital still camera (image pickup apparatus) using the optical system of the present invention for an imaging optical system. In FIG. 9, reference numeral 10 denotes a camera body, and reference numeral 11 denotes an imaging optical system including the optical system described in any one of Examples 1 to 4. Reference numeral 12 denotes a solid-state image sensor (photoelectric conversion element) such as a CCD sensor or a CMOS sensor which is built in the camera body, receives an optical image formed by the imaging optical system 11, and photoelectrically converts it. The camera body 10 may be a so-called single lens reflex camera having a quick turn mirror or a so-called mirrorless camera having no quick turn mirror.

By thus applying the optical system of the present invention to an image pickup apparatus such as a digital still camera, an image pickup apparatus having a compact lens can be obtained.

The above example can provide a compact optical system having a high optical performance, and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-183429, filed on Oct. 4, 2019, which is hereby incorporated by reference herein in its entirety.

What is claimed is:

1. An optical system comprising a plurality of lens units, wherein the plurality of lens units consist of, in order from an object side to an image side:
a first lens unit having a positive refractive power; and
a second lens unit having a positive refractive power,
wherein an interval between the first lens unit and the second lens unit changes during focusing,
wherein the second lens unit consists of, in order from the object side to the image side, a first subunit having a positive refractive power, an aperture stop, and a second subunit having a positive refractive power,
wherein the first lens unit includes a negative meniscus lens with a convex surface on the image side, and
wherein the following inequalities are satisfied:

$2.8 < f2A/f < 6.3$ $1.0 < f2/f < 1.9$ $3.0 < f1/f < 5.0$, and $1.1 < f2BD/f < 1.4$, where f2A is a focal length of the first subunit, f2 is a focal length of the second lens unit, f is a focal length of the optical system, f1 is a focal length of the first lens unit, and f2BD is a distance on an optical axis from a lens surface closest to an object of the second subunit to a lens surface closest to an image plane of the second subunit.

2. The optical system according to claim 1, wherein the first lens unit is fixed during focusing.

3. The optical system according to claim 1, wherein the following inequality is satisfied:

$4.0 < f2A/sk < 13.0$ where sk is a backfocus.

4. The optical system according to claim 1, wherein the following inequality is satisfied:

$2.5 < f2B/sk < 4.5$ where f2B is a focal length of the second subunit, and sk is a backfocus.

5. The optical system according to claim 1, wherein the following inequality is satisfied:

$1.0 < f1D/f < 2.0$ where f1D is a distance on an optical axis from a lens surface closest to an object of the first lens unit to a lens surface closest to an image plane of the first lens unit.

6. The optical system according to claim 1, wherein the following inequality is satisfied:

$2.0 < f1D/sk < 3.5$ where f1D is a distance on an optical axis from a lens surface closest to an object of the first lens unit to a lens surface closest to an image plane of the first lens unit, and sk is a backfocus.

7. The optical system according to claim 1, wherein the following inequality is satisfied:

$0.3 < f2AD/f < 0.6$ where f2AD is a distance on an optical axis from a lens surface closest to an object of the first subunit to a lens surface closest to an image plane of the first subunit.

8. The optical system according to claim 1, wherein the following inequality is satisfied:

$1.8 < f1/f2 < 3.0$.

9. The optical system according to claim 1, wherein a lens closest to an object has an aspherical surface.

10. The optical system according to claim 1, wherein the first subunit consists of three lenses including a positive lens, and
wherein the following inequality is satisfied:

$60 < vd2A < 100$ where vd2A is an Abbe number of the positive lens.

11. An image pickup apparatus comprising:
an optical system according to claim 1; and
an image sensor configured to receive an image formed by the optical system.

12. The optical system according to claim 1, wherein the second lens unit includes a negative meniscus lens with a convex surface on the image side.

13. The optical system according to claim 1, wherein the first lens unit includes a first negative lens closest to the object and a first positive lens adjacent to the first negative lens on the image side.

14. The optical system according to claim 13, wherein the first positive lens is a biconvex lens.

15. The optical system according to claim 1, wherein the second lens unit includes four or more negative lenses.

* * * * *